Jan. 29, 1935.  H. F. LÖWENSTEIN  1,989,326
INTELLIGENCE TESTING DEVICE
Filed Aug. 19, 1933  3 Sheets-Sheet 2

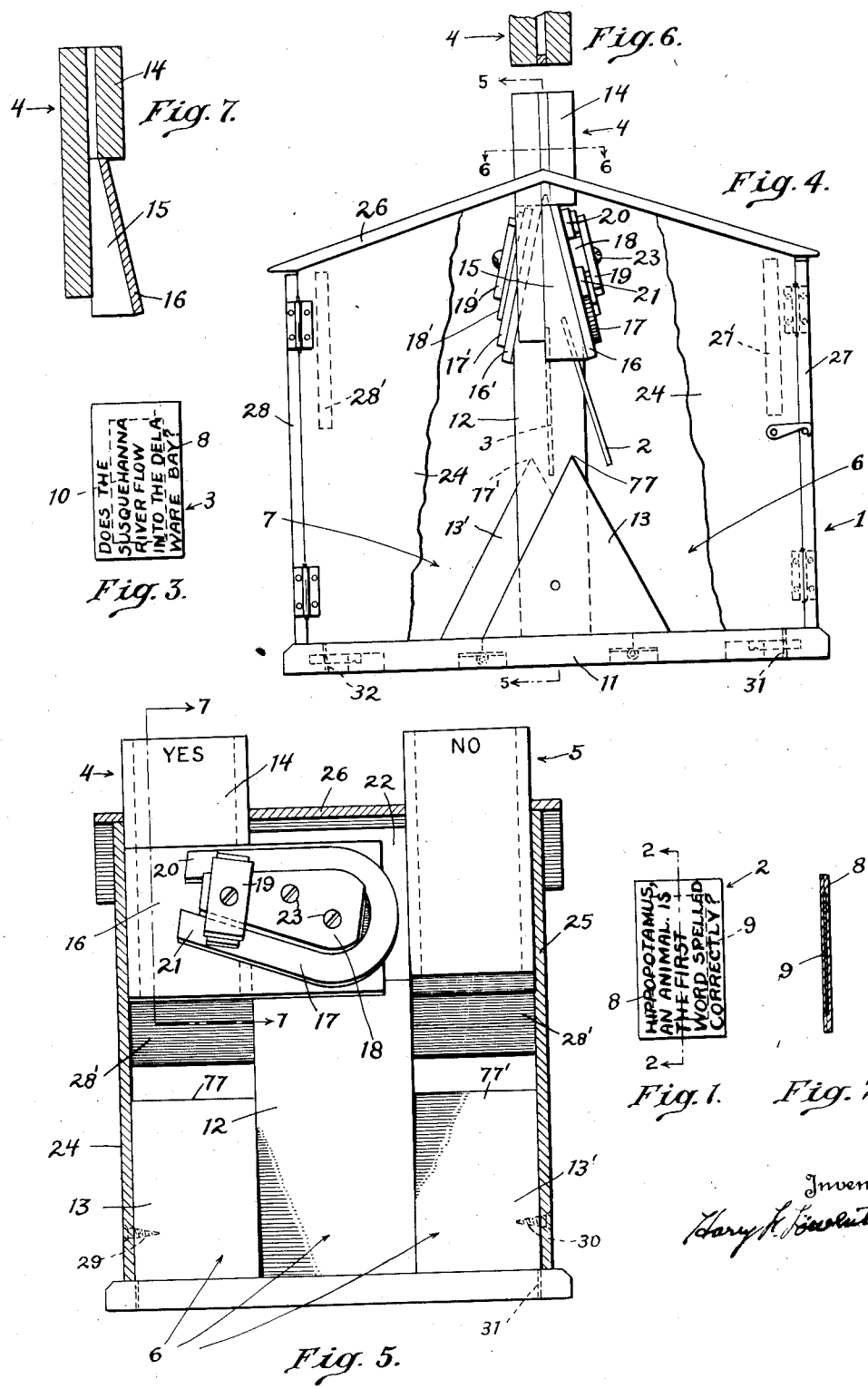

Inventor
Harry F. Löwenstein

Jan. 29, 1935.   H. F. LÖWENSTEIN   1,989,326
INTELLIGENCE TESTING DEVICE
Filed Aug. 19, 1933   3 Sheets-Sheet 3
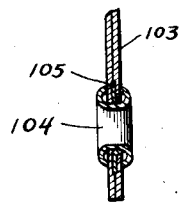
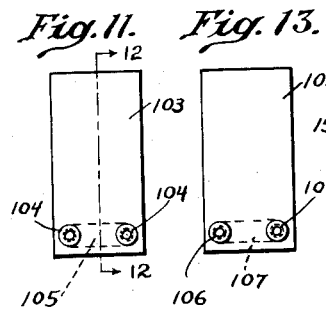
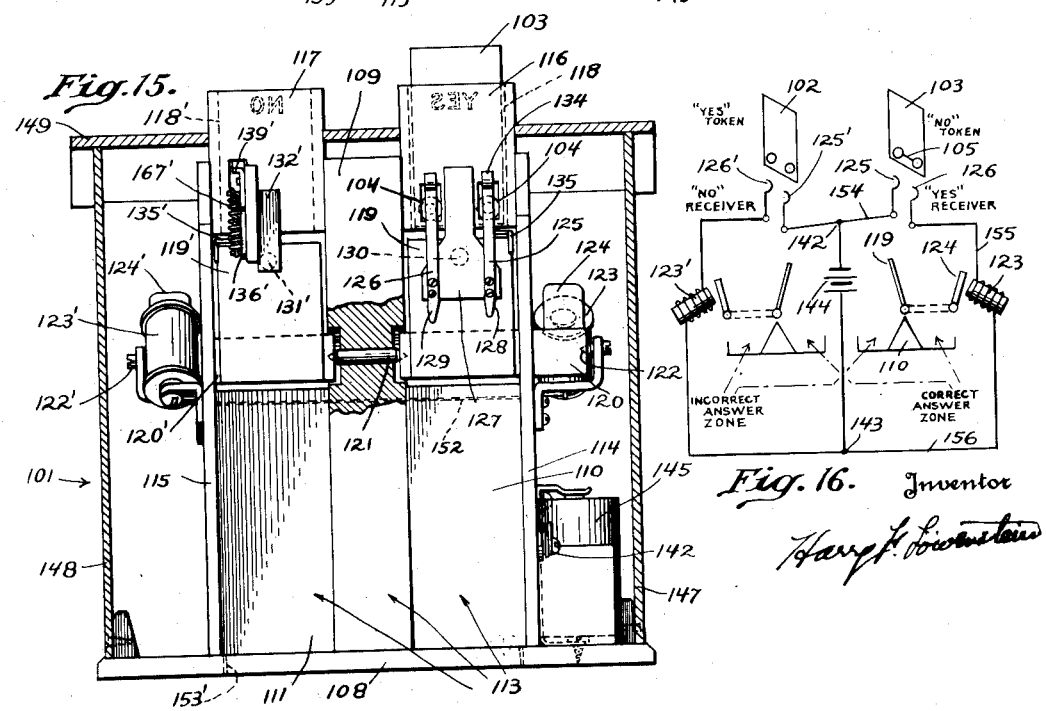
Inventor
Harry F. Löwenstein Patented Jan. 29, 1935

1,989,326

UNITED STATES PATENT OFFICE 1,989,326

INTELLIGENCE TESTING DEVICE

Harry F. Löwenstein, Washington, D. C.

Application August 19, 1933, Serial No. 685,920

10 Claims. (Cl. 35—12)

The present invention relates in general to educational devices and more particularly to an intelligence testing device. It has as its chief object the provision of a device of the above type operable automatically to show the number of questions answered correctly out of a group of any number of selected questions, which questions may be varied indefinitely without variation in the structure or operation of the device.

A further object of the invention is to enable the questions to be individually selected whereby single questions may be assembled into groups according to any branch of knowledge, or degree of advancement of learning in a given branch of knowledge, or in a miscellaneous group.

Another feature of the invention is its simplicity of operation, which enables it to be used by the unskilled with little instruction and without practice.

An important feature, especially of the preferred form of the invention, is the attainment of simplicity and sturdiness of structure, which makes for cheapness in manufacture and renders it practical as a toy for children, or an amusement device for adults.

The invention comprises in general a plurality of question records or tokens each bearing a question having one of two given answers, for example "yes" and "no", and a verifying device having a pair of token receivers designated "yes" and "no" for receiving the tokens and classifying them into a correct-answer zone and an incorrect-answer zone respectively, according as to whether or not the correct answer to the question borne by the token corresponds to the designation of the receiver into which it is dropped. Classification of the token by the verifying device is afforded by giving each token one or the other of two different imperceptible characteristics according as to whether the answer to the question borne by the token is "yes" and "no", and by rendering the verifying device operable to classify all tokens dropped into the receiver designated "yes", into the correct-answer zone or incorrect-answer zone according as to whether they have one or the other of said characteristics and to reversely classify all tokens dropped into the receiver designated "no".

The questions carried by the tokens may be various as to subject and degree of learning, for example:

Is 2 the cube root of 8?

Posative means affirmative. Is the first word spelled correctly?

Does Nebraska border on South Dakota?

Is table salt sodium bicarbonate?

If one acute angle of a right triangle is more than 60 degrees, can the other acute angle be less?

Tokens of a size convenient for handling, for example about one by one and three quarters of an inch, have been used in a reduction to practice and found to readily accommodate questions of 25 words or more.

One method of giving the tokens one of two different imperceptible characteristics is to render the different tokens or parts thereof magnetic or nonmagnetic. Another method is to render the different tokens or parts thereof conductive or non-conductive of electricity. In each case the verifying device is rendered operable to act upon the tokens according to the particular differentiating characteristics chosen. In any event the differentiating characteristics must be imperceptible in order that the individual taking the test may not be able to perceive the characteristic and thereby ascertain the correct answer without knowledge of the subject to which the question is related.

The invention also includes means for registering or recording the number of tokens passing into or through one of the classification zones for example the correct-answer zone, so as to register or make a record of the number of questions answered correctly, and to withhold indication of such number until a given total number of questions, correct or incorrect, have been answered.

With the foregoing and other objects and advantages in view, the invention will be more clearly understood from the following description of exemplary embodiments, reference being had to the following specification and the accompanying drawings.

In the drawings:

Fig. 1 is a face view of a magnetic token.

Fig. 2 is a section on line 2—2 of Fig. 1.

Fig. 3 is a face view of a non-magnetic token.

Fig. 4 is a side elevation of a preferred form of verifier with the near side wall partly broken away to show the interior.

Fig. 5 is a front elevation looking from the right in Fig. 4, with the casing in section on the line 5—5 of Fig. 4.

Fig. 6 is a fragmentary section of a receiver chute on line 6—6 of Fig. 4.

Fig. 7 is a vertical section through the chute 4 taken on the line 7—7 of Fig. 5.

Fig. 11 is a face view of a conductive token forming part of a modification.

Fig. 12 is a section on line 12—12 of Fig. 11.

Fig. 13 is a face view of a non-conductive token of the modification.

Fig. 14 is a side elevation of the verifier forming part of the modification, with the near side wall removed and the near partition partly broken away.

Fig. 15 is a rear elevation of the verifier of Fig. 14, looking from the left in Fig. 14, and with the casing in section on line 15—15 of Fig. 14.

Fig. 16 is a schematic diagram of the circuits and operating elements of Figs. 14 and 15.

Figure 8:
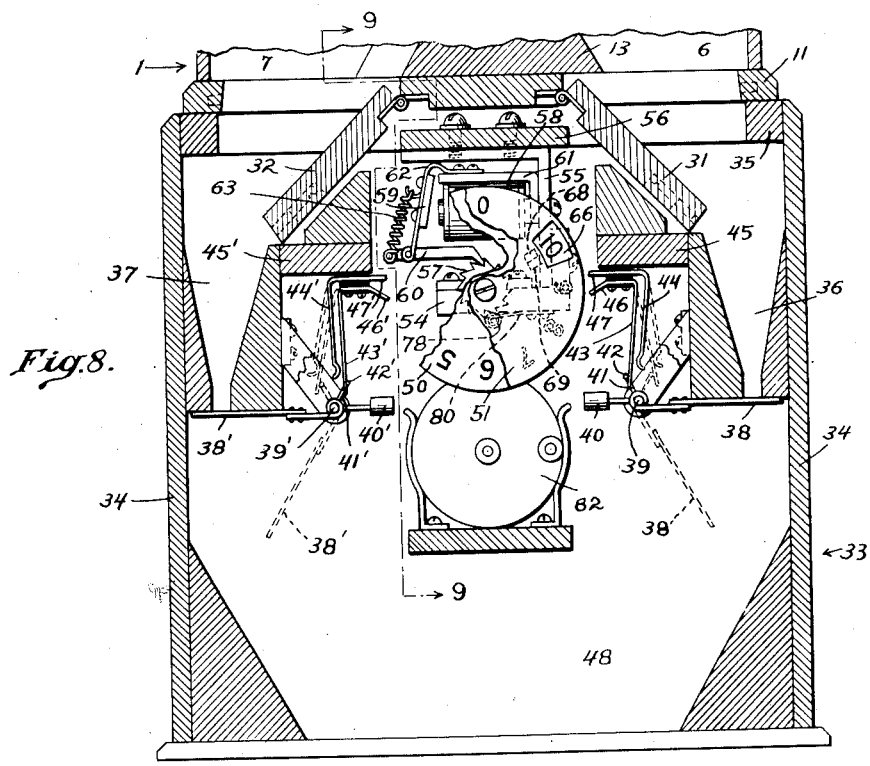
Fig. 8 is a side elevation of the totalizer in section on the line 8—8 of Fig. 9.

Referring to the drawings, and first to Figs. 1 to 10, the embodiment of the invention therein shown, comprises in general an answer verifier 1, and a plurality of two kinds of question records or tokens 2 and 3, each bearing a question having as its correct answer one of two given answers, for example "yes" and "no", according to its kind. The verifier is provided with a pair of token receivers 4 and 5, designated "yes" and "no" respectively, and a pair of classification zones 6 and 7 common to both the receivers. The questions on the tokens are to be answered by depositing them each in that one of the receivers which is designated by the answer believed to be the correct answer to the question. The token and answer verifier are so arranged and cooperatively related that the verifier will classify both kinds of tokens into the "correct" zone 6 or the incorrect zone 7 according as to whether or not the correct answer to the question carried by a token corresponds to the designation of the receiver into which it is dropped.

This cooperation between the two different kinds of tokens and the verifier is effected by giving to each token or a part thereof, one or the other of two different, imperceptible but otherwise distinguishable characteristics, in the present instance magnetic and non-magnetic, and by arranging the verifier to operate upon the tokens in the manner of a magnetic classifier to classify all tokens dropped into the "yes" receiver 4 into the "correct" zone 6 or "incorrect" zone 7 according as to whether or not they are magnetic or non-magnetic respectively, and to reversely classify, into the same zones, all tokens dropped into the "no" receiver 5.

The tokens may be made of all metal, some of magnetic metal such as iron, and the others of non-magnetic metal such as brass or other non-magnetic metal or alloy, and the difference in kind of metal rendered imperceptible by a common kind of metallic plating, painting or other suitable method of covering. Preferably, the tokens 2 and 3 are made each in the form of a paper ticket 8, the tokens 2 being provided each with a concealed plate 9 of magnetic material such as iron inserted between the plies of the paper ticket, while the tokens 3 are provided each with a similarly concealed plate 10 of non-magnetic material such as brass, the plates 10 and 9 being approximately the same as to characteristics perceptible through the paper covering such as thickness, stiffness and weight, so that the difference in kind of the token will not be perceptible to the user. In the present instance, the magnetic tokens 2 are the "yes" tokens each bearing a question the correct answer to which is "yes", while the non-magnetic tokens 3 are the "no"

tokens each carrying a question the correct answer to which is "no".

The verifier comprises a base 11 having mounted thereon a centrally located upright 12 and a pair of dividing members in the form of double ramps 13 and 13' one at each side of the upright which together with the upright divide the bottom portion of the verifier into the two zones 6 and 7. The receivers 4 and 5 are mounted near the top of the upright 12 and as they are alike in all respects, a detailed description of the receiver 4 will suffice for both, corresponding parts in the receiver 5 being designated by the same reference numerals primed. The receiver 4, for example, is in the form of a vertical chute having its upper portion 14 straight and its lower portion 15 flared or sloped outwardly to one side as is clearly shown in Fig. 4. For a purpose which will presently be explained, the chute is made of non-magnetic material in the present instance wood. Other suitable materials are "Bakelite", hard fiber, brass, porcelain etc. The sloping wall member 16 of the chute extends laterally of the chute and has secured to its outer surface a permanent magnet 17 of the ordinary horse shoe form, held in place by a filler block 18 and cleat 19, with the pole terminals 20—21 of the magnet located centrally, and near the top of the sloping side of the chute. The whole assemblage of chute and magnet is mounted on the upright 12 by means of the lateral extension of the member 16 which overlaps the front sloping face 22 (Fig. 5) of the upright 12 and is secured to the upright by the screws 23 passing through the block 18 and the member 16 into the upright. The wall member 16 being of non-magnetic material permits the magnetic field to extend into the interior of the chute in the path of tokens dropped therethrough and is given a thickness sufficient to permit a magnetic token dropped through the chute to be attracted toward or against the side portion 16 without sticking thereto. The chute 4 is mounted so that the vertical portion 14 is aligned centrally of the side of the upright 12, while the double ramp member 13 is mounted so that its ridge portion 77 will lie between the trajectory of non-magnetic tokens 3 falling vertically through the chute, as indicated in dotted lines (Fig. 4), and the trajectory of magnetic tokens 2 deflected to the right of the vertical as shown in solid lines.

All that has been said of the chute 4 and its relation to the ramp 13 as to structure and cooperative relation applies to the chute 5 and its associated ramp 13' because these assemblages are identical in all respects except that they are oppositely and symmetrically mounted with respect to the upright 12 so that the wall member 16' slopes to the rear and the ridge of the ramp 13' is offset to the rear as shown. Thus the whole structure when viewed from the side opposite to that of Fig. 1 will appear similar in all respects to Fig. 1.

A casing is provided which comprises the side walls 24—25, top 26 and hinged front and rear walls 27 and 28 respectively. To facilitate removal and replacement of the casing, it is arranged to be secured in place by screws 29—30 passing through the side walls 24—25 into the sides of the ramp 13—13' respectively. The hinged front and rear walls serve as doors which may be opened to permit removal of the tokens from the classification zones 6 and 7. Just inside of each hinged wall 27 and 28 is a screen partition 27' and 28' respectively, extending across the upper part of the casing to screen the bottoms of the chutes and the magnets from view when the hinged end walls are opened for removal of the tokens. The screen partitions also serve to brace and strengthen the casing. To enable the tokens to accumulate in the zones 6 and 7, or to pass on to the correct-answer totaling means or totalizer, Fig. 8, at the option of the user, trap-doors 31 and 32 are provided in the base 11 at the front and rear portions respectively.

Figures 9, 10:
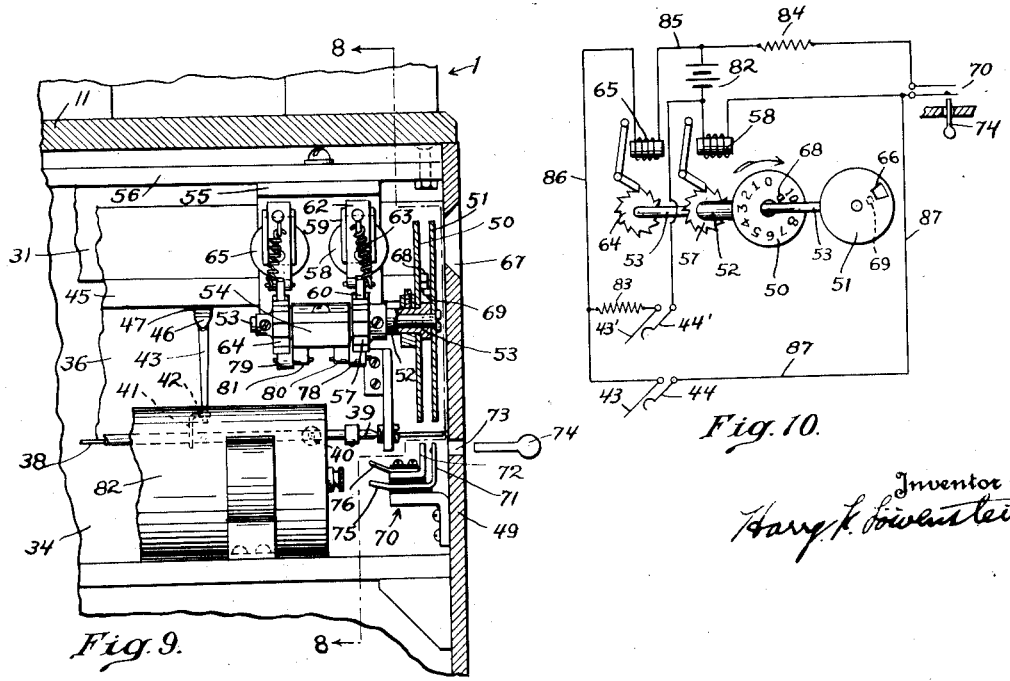
Fig. 9 is a rear view of the totalizer mechanism in section on the line 9—9 of Fig. 8.
Fig. 10 is a schematic diagram of the circuits and operating elements of Figs. 8 and 9.

Referring more particularly to Figs. 8 to 10, the correct-answer totaling element or totalizer indicated as a whole by the numeral 33, comprises a casing 34 arranged to receive the base 11 upon the edges or rim 35 of its open top, with the trap-doors 31 and 32 opened downwardly as shown in Fig. 8. Mounted in the front of the casing 34 so as to be positioned below the trap-door 31 is a correct-answer chute 36, while at the rear of the casing, similarly mounted therein with respect to the trap-door 32 is an incorrect-answer chute 37. The bottom of the chute 36 is normally closed by a thin light flap 38 pivoted at 39 and slightly over counter-balanced by a small counter weight 40 to bias it in the position shown in solid lines but permit it to drop open under the weight of a token falling into the chute 36. Connected to turn with the flap about the axis of the pivot 39 is a contact actuating arm 41 having a laterally extending stud portion 42 arranged to bear against a contact spring 43 and move it into contact with a spring 44 upon downward movement of the flap as indicated in dotted lines. This contact springs are made sufficiently thin to be readily actuated by the weight of a token acting on the flap, the force of which action is increased by the increased leverage of the flap over arm 41. The contact springs 43 and 44 are mounted in insulated relation to each other on the transverse beam 45 as shown, and provided with extension tabs 46 and 47 respectively for connection with an operating circuit to be later described. The chute 37 is also provided with a circuit controlling flap and contact assemblage similar in all respects to that of the chute 36 just described, similar parts being indicated by the same reference numerals primed. Below the chutes 36 and 37 is a common receiving chamber 48 for all tokens falling through the chutes.

Between the chutes 36 and 37 and near the left side wall 49 of the casing is mounted the operating mechanism which comprises a number disk 50 and a window disk 51 mounted at the ends of concentric shafts 52 and 53 respectively. The central shaft 53 is journaled in the outer tubular shaft 52, the latter being journaled on the supporting base 54. The supporting base is secured to the angle piece 55 which in turn is secured to the transverse beam 56. The number disk shaft 52 is arranged to be stepped around by a ratchet wheel 57 fixed thereon and driven by a stepping magnet 58 through armature 59 and pawl 60. The armature is mounted on the magnet return arm 61 by means of the leaf spring 62 and thereby biased in the retracted position shown. The leaf spring 62 extending below the armature forms a support for the pivot of the pawl 60, the latter being tensioned downwardly against the ratchet wheel by a retractile coil spring 63. The window disk shaft 53 is arranged to be stepped around by a ratchet wheel 64 fixed thereon and driven by a stepping magnet 65 through a driving arrangement similar in all respects to the driving arrangement for the ratchet 57.

The number disk 50 which is shown in its normal position is arranged to display a series of numbers for example 0 to 10 as indicated, while the window disk, also shown in normal position is arranged in front of the number disk and provided with a window 66 limited in size to expose but one of the numbers at a time. An outer window 67 provided in the casing wall 49 is arranged so as to register with the window 66 when the latter is in the uppermost position. For restoring the disks to the normal relative position shown, after relative displacement, the number disk 50 is provided on its front face with a lug 68 arranged to engage a lug 69 on the rear face of the window disk when both are in their normal relative position so that by rotating the number disk in the direction of the arrow, after engagement of the lugs, to bring the number disk to the normal position with the numeral "0" uppermost, the window disk will be brought to the normal position with the window 66 in register with the number "10" and thus out of register with the outer window 67. Thus both disks may be restored to normal by rotating the number disk. To this end the stepping magnet 58 is arranged to be independently actuated at will through a restoring switch 70 comprising a pair of spring contacts 71 and 72 arranged to be operated through an opening 73 in the casing wall 49 by a separable pusher plug or key 74. The contact springs are suitably insulated and provided with wiring tabs 75 and 76 for circuit connection. Aligning rollers 78 and 79 are provided for the ratchets 57 and 64 to properly align them and the disks after each step, the rollers being mounted on the base 54 and tensioned against the ratchet teeth by leaf spring mountings 80 and 81. A dry cell battery 82 supplies current for energizing the stepping magnets. For the sake of clearness and to avoid obscuring important apparatus details, the electric circuit connections between the various apparatus elements have been omitted from Figs. 8 and 9 and for an understanding of such connections reference is to be had to the circuit diagram of Fig. 10.

Referring to the circuit diagram of Fig. 10 it will be noted that the contact springs 43—44 are arranged to connect both the number disk stepping magnet 58 and the window disk stepping magnet 65 in series with the battery 82; contacts 43'—44' are arranged to connect only the window disk magnet 65 and a compensating resistance 83 in series with the battery; while the restoring switch 70 is arranged to connect only the number magnet 58 and a compensating resistance 84 in series with the battery. The purpose of the compensating resistances is to prevent too great an increase in current flow when only one of the magnets is connected in circuit. Also by assuring a more uniform application of power as between the operation of one or both disks so that any noise or vibration produced in operation will be substantially the same whether one or both disks are stepped, the user will not be apprised as to what kind of operation has taken place.

In operation, assuming that the trap doors 31 and 32 in the bottom of the verifier are closed, and a group of ten tokens has been selected, giving ten questions to be answered, the user or subject being tested drops each token into one or the other of the receivers 4 and 5, designated "yes" and "no", according as to whether he believes the answer to the question on the token is yes or no. If the first token is a magnetic one the answer to its question is "yes", and if the question is correctly answered by dropping the token in the "yes" receiver 4, it will be deflected by the magnet 17 to the right or front side of the ramp 13 (Fig. 4) and guided by the ramp into the correct-answer zone 6. Had the question been incorrectly answered by dropping the token in the "no" receiver 5, the token would have been deflected by the magnet 17' to the left or rear side of ramp 13' (Fig. 4) and guided by the ramp into the incorrect-answer zone 7. If the next token is a non-magnetic one the answer to its question is "no", and if the question is correctly answered by dropping the token in the "no" receiver, the token being non-magnetic and consequently uninfluenced by the magnet 17' will drop vertically to the right or front side of ramp 13' (Fig. 4) and be guided by the ramp into the correct-answer zone 6. Had this second question been incorrectly answered by dropping the token in the "yes" receiver 4, it would have dropped vertically to the left or rear of ramp 13', the ramp guiding it into the incorrect-answer zone 7.

Upon opening the hinged front portion 27 after the ten tokens have been deposited, the number and identity of questions correctly answered are revealed to the user by the presence in the front compartment of all the tokens whose questions have been correctly answered whether by yes or no. Likewise, all the tokens whose questions were incorrectly answered will be found in the rear compartment.

Where it is desired to register or record the number or percentage of correct answers without informing the user as to what questions were incorrectly answered, the trap doors 31 and 32 in the bottom of the verifier are opened into the totalizer 33, as indicated in Fig. 8. The user drops the ten tokens into the "yes" and "no" receivers as before, but now the tokens instead of remaining in the correct-answer zone 6 or incorrect-answer zone 7, will pass on through the chute 36 or 37 respectively. Here each time a token passes into the zone 6 and down through the chute 36, representing a question correctly answered, the flap 38 is swung down by the weight of the token into the position shown in dotted lines in Fig. 8, while the arm 41 and contact springs 43 and 44 are moved into the dotted line position to close the energizing circuit of stepping magnets 58 and 65. This circuit (Fig. 10) may be traced from battery 82, over wire 85, magnet 65, wire 86, contact springs 43—44, wire 87 and magnet 58 back to battery. Magnets 58 and 65 becoming energized step their respective ratchets 57 and 64 around in a clockwise direction for the angular distance of one ratchet tooth. Thus both number disk and window disk are stepped around through this angular distance which brings the numeral "1" on the number disk to the uppermost position opposite the outer window 67 but obscured by the window disk 51, the movable window 66 remaining over the numeral "10" on the number disk. The token sliding off the flap 38 permits the flap to return to the normal position shown in solid lines in Fig. 8, which opens the spring contacts 43—44 deenergizing magnets 58 and 65, the centering rollers 78 and 79 aligning and holding the ratchets and disks in the angular positions into which they were last moved.

Each time a token passes into the zone 7 and down through the chute 37, representing a question incorrectly answered, the flap 38' is swung down by the weight of the token into the dotted line position (Fig. 8), closing the contact springs 43'—44' as shown in dotted lines, which closes the energizing circuit of the window disk stepping magnet 65 only. This circuit (Fig. 10) may be traced from battery 82, over wire 85, magnet 65, wire 86, resistance 83, contact springs 43'—44' and back to battery. The energization of magnet 65 alone causes only the ratchet 64 to be stepped around in a clockwise direction and with it the window disk 51 for an angular distance of one ratchet tooth, bringing the movable window around another unit space independently of the number disk which in this instance remains stationary. The token now sliding off flap 38' permits the flap to return to normal position which opens spring contacts 43'—44' deenergizing magnet 65.

Thus the number disk 50 is stepped around one step for each correct answer only, while the window disk 51 is stepped around one step for each answer whether correct or incorrect, with the result that after a total of ten questions has been answered, and only then, the movable window 66 will come in register with both the outer window 67 and the uppermost number on the number disk, revealing the total number of correct answers out of ten. The window disk thus acts as a limiting means operable to limit the total number of answers, for example, to ten.

To restore the totalizer to zero or normal position ready for another test, the restoring key 74 is inserted through the opening in the casing and used to momentarily close the restoring switch 70 and energize the number magnet 58 a sufficient number of times to step the number disk 50 (Figs. 8 to 10) around in a clockwise direction to the zero or normal position shown. This rotation of the number disk into the zero position also moves the window disk 51 into its normal position as shown by engagement of the lug 68 on the number disk with the lug 69 on the window disk.

As will be seen from the foregoing description, both the front compartment or correct answer zone 6 of Fig. 4 and the registering mechanism, number disk 50 etc. of Figs. 8 to 10, constitute means for indicating the number of tokens correctly put into the receivers, the first by actual accumulation of those tokens correctly placed, and the latter by tallying or registering the number of tokens correctly placed. It is therefore to be understood that the specification in the claims of means for indicating the number of tokens correctly put into the receivers, is intended to include both such embodiments of said means or their equivalent.

The invention is not limited to the utilization of magnetic differentiaton between the two kinds of tokens, but may utilize other forms of differentiation, for example electrical differentiation accomplished by rendering the different tokens or parts thereof conductive or non-conductive. A modified form of the invention utilizing the qualities of conductivity and non-conductivity or a wide difference in conductivity for imperceptibly characterizing the tokens, is shown in Figs. 11 to 16. This form of the invention is the same in general principle as the preferred form shown in Figs. 1 to 10, and operates in the same general manner, except that the tokens when dropped in the receivers are diverted to one or the other of the classification zones by electrically controlled means, according as to whether certain portions of a token are or are not electrically connected.

Referring to Figs. 11 to 16, this form of the invention comprises in general an answer verifier indicated as a whole by the reference numeral 101, and a plurality of two kinds of question records or tokens 102 and 103. The tokens are made of card board, each with a pair of hollow metal rivets or grommets inserted near the lower end as shown. In the token 103, the grommets 104 are electrically connected by a thin strip of metal 105 such as tinfoil or thin sheet brass inserted between the plies of paper and wholly within the margins of the token so as to be imperceptible to the user. The token 102 is the same in all respects as the token 103 except that the grommets 106 remain unconnected electrically, and are preferably connected by a thin strip of non-conducting material 107 such as paper simply for the sake of uniformity of structure so that any welt or other indication of the presence of a connecting strip between the grommets will appear on both kinds of tokens. In the present instance the non-conducting tokens 102 are the "yes" tokens and the conducting tokens 103 are the "no" tokens.

The verifier 101 comprises a base member 108 having mounted thereon a centrally located upright 109 and a pair of ramps 110 and 111 one at each side of the upright, which together with the upright divide the verifier into two zones, a correct-answer zone 112 and an incorrect-answer zone 113, at the front and back respectively. Side partitions 114 and 115 are mounted flush against the outer sides of the ramps 110 and 111 respectively, defining the side limits of the zones 112 and 113. The receivers 116 and 117, made of wood or other suitable non-conducting material, are mounted near the top, one to each side of the upright 109 between the upright and the adjacent partition. These receivers are in the form of vertical chutes having their passage ways 118—118' vertically aligned with the ridges of the double ramps 110 and 111 respectively. The receiver 116 is the "yes" receiver, while 117 is the "no" receiver. As the means associated with each receiver element 116 and 117 for selectively diverting the tokens to the different zones on one or the other side of the associated ramp, are alike in all respects, a detailed description of one, for example that associated with the receiver 116 will suffice, corresponding parts associated with receiver 117 being designated by the same reference numerals primed.

For diverting the tokens to one or the other side of the ramp 110, a flap 119 pivotally mounted near its lower end just above the ridge of the ramp, and extending upwardly from the ramp to the bottom of the receiver chute 116, is arranged to swing slightly beyond either side of the passage way 118. The flap 119 is carried by a pivoted beam 120 pivoted at the inner end in the upright 109 on the pivot pin 121 and at the outer end on the pin 122 outside the partition. The flap 119 is arranged to be swung from the normal position as shown in solid lines in Fig. 14 to the dotted line position by the magnet 123 and armature 124, the magnet being mounted on the outside of the partition 114, while the armature is mounted on the outer end of the pivoted beam 120. For controlling the magnet 123 over a circuit to be later described, a pair of contact springs 125—126 are provided which extend into the passage way 118 of the receiver 116 so as to make contact one with each of the grommets of a token passing through the receiver as shown in dotted lines in Fig. 14. The springs 125—126 are suitably mounted on a bracket 127 of insulating material and provided with circuit connecting tabs 128—129 respectively. A stop pad 130 mounted on the bracket 127 limits the swing of the flap 119 in the direction of the bracket, while a similar stop pad 131 mounted on bracket 132 appendent from the receiver, similarly limits the movement of the flap in the opposite direction. The stop pads are made of felt, soft rubber or the like, in order to render noiseless the engagement of the flap with the stops in its quick movement from one to the other under the action of the retractile spring 133 or armature 124. The retractile spring 133 is arranged to hold the flap normally in the position shown.

The contact springs are each provided with a returned portion like the return portion 134 of the spring 125 which acts as a stop operable to engage the side of the receiver to limit the movement of the spring into the passage way 118 to an extent sufficient to engage with a grommet on the token, but insufficient to bear forcibly against the body of the token after the grommet has passed down beyond the spring. To ensure the tokens being pushed down with the grommets clear of the contact springs, the parts are so related that a portion of the token will remain above the top of the receiver so long as the springs are in engagement with the grommets as is clearly shown in Fig. 14.

It will be clear that with the flap 119 in the position shown in solid lines in Fig. 14, a token passing down out of the receiver chute 116 will be diverted by the flap 119 and ramp 110 into the zone 112, while with the flap in the dotted line position a token passing down out of the chute will be diverted into the zone 113. As will be described more in detail later, operation of the magnet 123 depends upon contact of the contact springs with a pair of electrically connected grommets on a token, and to prevent the flap from moving out of the actuated position after the grommets have been disengaged from the contact springs and before the token has had time to drop substantially free of the receiver chute, the flap is provided with a detent element 135 arranged to catch under the pawl 136 upon movement of the flap into the dotted line position (Fig. 14), and to hold the latter in such position until the pawl is tripped. The pawl 136 is pivoted at 137 and is normally held in the position shown by retractile spring 167. For tripping the pawl each time a token is started down the receiver chute and before the grommets reach the contact springs, a token actuated tripping lever 138—139 is provided in the form of a bell crank lever pivoted at 140 with one arm 138 engaging an arm 141 on the pawl and the other arm 139 extending into the passage way 118 for a distance sufficient to be engaged and actuated by a grommet but insufficient to bear forcibly against the body of the token. The tripping lever 138—139 is biased in the position shown by the retractile spring 167 through engagement of the arm 141 with arm 138.

All that has been said of the receiver 116 and the elements associated therewith for diverting the tokens to one or the other side of the ramp 110, as to structure and cooperative relation, applies to the receiver 117 and its appurtenances, because the two assemblages are identical in all respects except that they are oppositely and symmetrically mounted with respect to the upright 109.

Electric current for operating the magnets 123 and 123' is supplied from the terminals 142 and 143 of a battery 144 of dry cells 145—146.

A casing is provided which comprises the side walls 147 and 148, top 149 and front and rear end walls 150 and 151 respectively. The end walls 150 and 151 are provided with hinged doors 152 and 153 respectively, for access to the classification zones 112 and 113. To enable the tokens to accumulate in the zones 112 and 113 or to pass on to the correct answer totaling element of Fig. 8, at the will of the user, trap-doors 152' and 153' are provided in the base 108 at the bottoms of the zones 112 and 113 respectively.

For the sake of clearness and to avoid obscuring important apparatus details, complete circuit connections between the different apparatus elements have been omitted from Fig. 14, and for an understanding of such connections reference is to be had to the circuit diagram of Fig. 16.

Referring to Fig. 16, it will be noted that the deflecting magnet 123 is connected in series with its associated contact springs 125—126 and the battery 144, while the deflecting magnet 123' is similarly connected with its associated contact springs 125'—126' and the battery 144. A "no" token 103, that is one of the type in which the grommets are electrically connected by a concealed metal strip 105 is shown above the contact springs 125—126, while a "yes" token, that is one of the type in which the grommets are not electrically connected, is shown above the springs 125'—126'.

In the operation of the modification shown in Figs. 11 to 16, the user drops each token, grommet end first, into the "yes" receiver 116 or the "no" receiver 117, according as to whether he believes the answer to the question on the token is yes or no. If the first token is a "no" token such as 103, that is one in which the grommets are electrically connected by a concealed metal strip 105, and the user answers the question incorrectly by depositing it in the "yes" receiver 116, the grommets 104 passing the springs 125—126 complete the energizing circuit of deflecting magnet 123, which circuit may be traced as follows, reference being had to Fig. 16: from battery 144 and battery terminal 142 over conductor 154, contact spring 125, grommets 104 connected by metallic strip 105, contact spring 126, conductor 155, magnet 123, to battery terminal 143 and back to battery 144. Magnet 123 becoming energized attracts its armature 124 which rocks the shaft 120 and with it the flap 119 into the dotted line position shown in Fig. 14. Movement of the flap to the dotted line position causes the detent 135 to engage under the pawl 136. The token being pushed down until the grommets pass down out of contact with contacts 125—126 drops on to the flap which latter being in the dotted line position deflects the token to the left side of ramp 110 and into the incorrect answer zone 113. After the grommets of the token leave the contact springs, the circuit of magnet 123 is opened deenergizing the magnet, but the flap 119 remains in its actuated position due to engagement of detent 135 with pawl 136, thus preventing the flap from returning to normal while the token is passing out of the chute.

Had the question been correctly answered by depositing the "no" token in the "no" receiver 117 the magnet 123', armature 124' and flap 119' (Fig. 15) would have been operated in a manner similar in all respects to that of the magnet 123, armature 124 and flap 119 as described immediately above, except that as the magnet 123' and associated elements are reversely arranged with respect to the zones 112 and 113, the token would have been deflected into the correct answer zone 112. If the next token is a "yes" token such as 102, that is one in which the grommets are not electrically connected, and the user answers the question correctly by depositing the token in the "yes" receiver 116, one of the grommets in passing down the chute will strike the end of the lever 139 rocking it downwardly, which motion will be transmitted through lever arms 138 and 141 to trip the pawl 136 upwardly and release the detent 135 permitting the flap 119 to return to normal position under tension of retractile spring 133. The grommets passing on to the springs 125—126 cannot act as a bridging connection across the springs because of the absence of a conducting strip between the grommets, so that the magnet 123 is not energized, and the flap remains in the normal position to deflect the falling token into the correct answer zone 112. Had the "yes" token been incorrectly answered by depositing it in the "no" receiver 117, the pawl 136' would have been released to restore the flap 119' to normal position, the magnet 123' remaining deenergized in a manner similar in all respects to the operation described immediately above, except that as the flap 119' and associated parts are reversely arranged with respect to the zones 112 and 113, the token would have been deflected into the incorrect answer zone. After a number of questions have been thus answered, the front door (Fig. 14) may be opened whereupon the number and identity of the questions correctly answered are revealed to the user by the presence in the front compartment or correct answer zone 112 of all tokens whose questions were correctly answered. Likewise, all tokens whose questions were incorrectly answered will be found in the rear compartment. Where it is desired to register or record the percentage of correct answers without informing the user as to what questions were correctly or incorrectly answered, the trap doors 152' and 153' are opened and the verifier placed upon the totalizer shown in Fig. 8, and used therewith, all in the same manner as that previously described for the use of the verifier of Figs. 4 and 5 with the totalizer.

An advantage of the use of a verifier alone is that with it a student may actually learn a subject by repeated review of the questions and verification of his answers. A greater advantage lies in the use of a verifier in cooperation with the totalizer in that the student, to improve his percentage, is compelled to review the whole subject with his last answers in mind. A further advantage of the totalizer is that it may be arranged to print and issue a record ticket in the manner of the well known automatic weighing machines, thus in effect issuing a diploma. A further advantage of the preferred form of verifier is that it has no moving parts and therefore may be made extremely sturdy by forming it of cast metal.

While I have herein shown and described specifically a preferred form and certain modifications of the invention, it is to be understood that the invention is not limited to such specific embodiments but contemplates all such variations and modifications as fall fairly within the scope of the appended claims.

What I claim is:

1. A mechanical system for testing intelligence comprising question tokens each having one of two kinds of characteristics imperceptible to the senses, according as to whether the correct answer to the question is affirmative or negative, means for classifying said tokens into a correctly answered class or an incorrectly answered class according to whether or not they have a given one of said characteristics, and other means for reversely classifying said tokens with respect to the same two classes.

2. An intelligence testing device comprising a plurality of separate question records each having one of two kinds of imperceptible characteristics and each bearing a question answerable by one of two given answers according as to whether it has one or the other of the two said characteristics respectively, so that a given characteristic is always associated with a given answer, a pair of receivers each designated by one of each of said answers, a correct answer zone, an incorrect answer zone, and a pair of means operatively associated with said receivers arranged to segregate into the correct-answer zone all records deposited into receivers designated by the answer which is associated with the characteristic of the record and into the incorrect-answer zone all records deposited into receivers designated by the answer which is not associated with the characteristic of the record.

3. An intelligence testing device comprising a plurality of question tokens each bearing a question correctly answerable by one of two given answers, those bearing a question answerable by a given one of said answers having a given characteristic imperceptible to the senses, while those bearing a question answerable by the other one of said answers are without said characteristic, a correct-answer zone and an incorrect-answer zone, a classifier designated by one of said two given answers arranged to classify said tokens into said correct-answer zone or said incorrect-answer zone according to whether they have or have not said characteristic respectively, and a second classifier designated by the other of said two given answers, arranged to classify said tokens reversely with respect to the same two zones.

4. An intelligence testing device comprising a plurality of separate question tokens each having one of two kinds of characteristics imperceptible to the senses and each bearing a question correctly answerable by one of two given answers according as to whether it has one or the other of the two said characteristics respectively, so that a given characteristic is always associated with a given answer, a pair of receivers each designated by one of each of said answers, a correct-answer zone, an incorrect-answer zone, means operatively associated with one of said receivers arranged to segregate into the correct-answer zone or the incorrect-answer zone the records deposited in that receiver according as to whether they have or have not a given one of said characteristics respectively, and means operatively associated with the other of said receivers arranged to segregate reversely into said zones the records deposited into said latter receiver.

5. An intelligence testing device comprising a plurality of separate question records each having one of two kinds of imperceptible characteristics and each bearing a question answerable by one of two given answers according as to whether it has one or the other of the two said characteristics respectively, so that a given characteristic is always associated with a given answer, a pair of receivers each designated by one of each of said answers, a correct-answer zone, an incorrect-answer zone, and means operatively associated with each of said receivers arranged to segregate into the correct-answer zone or the incorrect-answer zone the records deposited into that receiver according as to whether such records have or have not the characteristic corresponding to the answer by which that receiver is designated.

6. An intelligence testing device comprising a plurality of question tokens each having one of two mutually exclusive characteristics imperceptible to the senses, means for classifying said records into two different zones according as to whether they have or have not a given one of said characteristics, and other means for classifying said records into said zones in a reverse manner.

7. An intelligence testing device comprising a plurality of magnetic and non-magnetic tokens, each bearing a question answerable by one of two given answers according as to whether the token is magnetic or non-magnetic, a pair of classification zones, and a pair of magnetic classifiers to which said zones are common, one classifier arranged to classify said tokens into one or the other of said zones according to whether they are magnetic or non-magnetic, respectively, and the other classifier arranged to classify said tokens into the same said one or other zone according as to whether the tokens are non-magnetic or magnetic, respectively.

8. In an intelligence testing device, means for registering the number of correct answers, and means concealing the registering means from view and operable in response to a given number of answers to reveal the number of correct answers.

9. In an intelligence testing device a correct answer totalizer for totaling the number of correct answers, and means for concealing the total until after a given number of answers have been made.

10. An intelligence testing device comprising a plurality of different kinds of tokens each bearing a question answerable by one of two given answers according to the kind of token, and a pair of receivers for said tokens each intended to receive tokens answerable by one of said answers, respectively, and means for indicating the number of tokens correctly put into the receivers.

HARRY F. LÖWENSTEIN.

CERTIFICATE OF CORRECTION.

Patent No. 1,989,326. January 29, 1935.

HARRY F. LÖWENSTEIN.

It is hereby certified that error appears in the printed specification of the above numbered patent requiring correction as follows: Page 1, first column, line 37, for "token" read tokens; and line 41, for "and" first occurrence, read or; and page 3, first column, line 33, for "This" read The; and that the said Letters Patent should be read with these corrections therein that the same may conform to the record of the case in the Patent Office.

Signed and sealed this 9th day of April, A. D. 1935.

Leslie Frazer (Seal) Acting Commissioner of Patents.